(12) United States Patent
Kato (10) Patent No.: US 9,644,579 B2
(45) Date of Patent: May 9, 2017

(54) FUEL SUPPLY SYSTEM

(71) Applicant: DENSO CORPORATION, Kariya, Aichi-pref. (JP)

(72) Inventor: Masaaki Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 139 days.

(21) Appl. No.: 14/790,016

(22) Filed: Jul. 2, 2015

(65) Prior Publication Data

US 2016/0003199 A1    Jan. 7, 2016

(30) Foreign Application Priority Data

Jul. 3, 2014    (JP) .................................. 2014-137715

(51) Int. Cl.

| | | |
|---|---|---|
| F02M 37/04 | (2006.01) | |
| F02M 31/02 | (2006.01) | |
| F02M 39/00 | (2006.01) | |
| F02M 21/02 | (2006.01) | |
| F02M 21/06 | (2006.01) | |
| F02D 19/02 | (2006.01) | |
| F02M 53/02 | (2006.01) | |
| F02M 53/06 | (2006.01) | |
| F02M 59/10 | (2006.01) | |

(52) U.S. Cl.
CPC ........... *F02M 31/02* (2013.01); *F02D 19/022* (2013.01); *F02M 21/0212* (2013.01); *F02M 21/0245* (2013.01); *F02M 21/06* (2013.01); *F02M 39/005* (2013.01); *F02M 53/02* (2013.01); *F02M 53/06* (2013.01); *F02M 59/102* (2013.01); *F02M 2200/40* (2013.01); *F02M 2200/953* (2013.01); *Y02T 10/32* (2013.01)

(58) Field of Classification Search
CPC ........ F02M 37/04; F02M 15/00; F02M 21/02; F02M 31/02; F02M 53/06; F02M 53/02
USPC ................................ 123/514, 543, 545, 557
See application file for complete search history.

(56) References Cited

U.S. PATENT DOCUMENTS

| | | | | |
|---|---|---|---|---|
| 4,503,832 A | * | 3/1985 | Pefley | ..................... F02B 43/00 123/1 A |
| 5,291,869 A | * | 3/1994 | Bennett | ................ F02M 69/465 123/41.31 |
| 6,216,675 B1 | * | 4/2001 | Bennett | ............ B60K 15/03006 123/514 |
| 6,325,051 B1 | * | 12/2001 | Oomori | .................. F02M 37/20 123/447 |

(Continued)

FOREIGN PATENT DOCUMENTS

| | | |
|---|---|---|
| JP | 2010-196471 | 9/2010 |
| JP | 2010-196687 | 9/2010 |

(Continued)

*Primary Examiner* — Thomas Moulis
(74) *Attorney, Agent, or Firm* — Nixon & Vanderhye P.C.

(57) ABSTRACT

A fuel supply system has a pressure chamber which communicates with a fuel gallery. The pressure chamber receives the fuel from the feed pump or the returned fuel from the fuel gallery. The fuel in the pressure chamber receives heat energy from the engine E so that the fuel is brought into gas-liquid phase. A volume change of the fuel in liquid phase in the fuel gallery can be compensated by a volume change of the fuel in gas phase or gas-liquid phase in the pressure chamber. Thus, the pressure pulsation in the fuel gallery is absorbed in the pressure chamber.

8 Claims, 13 Drawing Sheets

(56) References Cited

U.S. PATENT DOCUMENTS

| | | | |
|---|---|---|---|
| 8,516,997 B2* | 8/2013 | Pursifull | F02D 19/0605 |
| | | | 123/516 |
| 2011/0023853 A1* | 2/2011 | Lund | F02D 19/0647 |
| | | | 123/590 |

FOREIGN PATENT DOCUMENTS

| | | |
|---|---|---|
| JP | 2010-203286 | 9/2010 |
| JP | 2012-193637 | 10/2012 |

* cited by examiner

FUEL SUPPLY SYSTEM

CROSS-REFERENCE TO RELATED APPLICATION

This application is based on Japanese Patent Application No. 2014-137715 filed on Jul. 3, 2014, the disclosure of which is incorporated herein by reference.

TECHNICAL FIELD

The present disclosure relates to a fuel supply system which supplies liquefied gas fuel into a combustion chamber of an internal combustion engine.

BACKGROUND

JP-2012-193637A shows a fuel injection system in which a high-pressure pump supplies high-pressure fuel to a common-rail and a fuel injector injects the high-pressure fuel in the common-rail into a combustion chamber of an engine.

A high-pressure pump has a fuel gallery, a pump chamber and a plunger.

When the plunger reciprocates to discharge or suction the fuel, a pressure pulsation is generated in the fuel gallery. The pressure pulsation in the fuel gallery causes insufficient fuel suction. It is likely that sufficient fuel supply is hardly conducted. Moreover, it is likely that oil-tight in a feed passage or a return passage may be deteriorated.

A bladder type accumulator or a pulsation damper can be provided to reduce the pressure pulsation in the fuel gallery. However, in the bladder type accumulator, it is always necessary to keep the gas in a rubber bladder, which takes a time.

Also, in a case that dimethyl ether (DME) is used as principal component of the fuel, it is necessary to use a special rubber material for the rubber bladder. It is likely that a pressure pulsation of high frequency may not be absorbed.

Moreover, in a case that liquefied gas fuel including DME as a principal component is used, the volume of the accumulator and the pulsation damper becomes large in order to absorb the pressure pulsation. However, it is difficult to arrange the accumulator or the pulsation damper having large volume in a fuel supply system for a vehicle.

SUMMARY

It is an object of the present disclosure to provide a fuel supply system which supplies liquefied gas fuel into a combustion chamber and absorbs a pressure fluctuation in a fuel gallery of a high-pressure pump.

According to one aspect of the present disclosure, a fuel supply system has a fuel tank containing a liquefied gas fuel, a feed pump feeding the liquefied gas fuel from the fuel tank, a high-pressure pump and a pressure chamber.

The high-pressure pump has a fuel gallery into which the fuel in liquid phase is introduced from the feed pump, a pump chamber into which the fuel is introduced from the fuel gallery and a plunger which pressurizes the fuel in the pump chamber.

The pressure chamber communicates with the fuel gallery and receives the fuel from the feed pump or the returned fuel from the fuel gallery. The fuel in the pressure chamber receives heat energy from a heat source so that the fuel is brought into gas-liquid phase.

In the fuel gallery, the fuel is in the liquid phase state. In the pressure chamber, the fuel is in the gas-liquid phase.

According to the above configuration, a volume change of the fuel in liquid phase in the fuel gallery can be compensated by a volume change of the fuel in gas phase or gas-liquid phase in the pressure chamber. Thus, the pressure pulsation in the fuel gallery is absorbed in the pressure chamber.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereinafter.

First Embodiment

Referring to FIGS. 1 to 5, a configuration of a fuel supply system 1 according to a first embodiment will be described.

Figure 1:
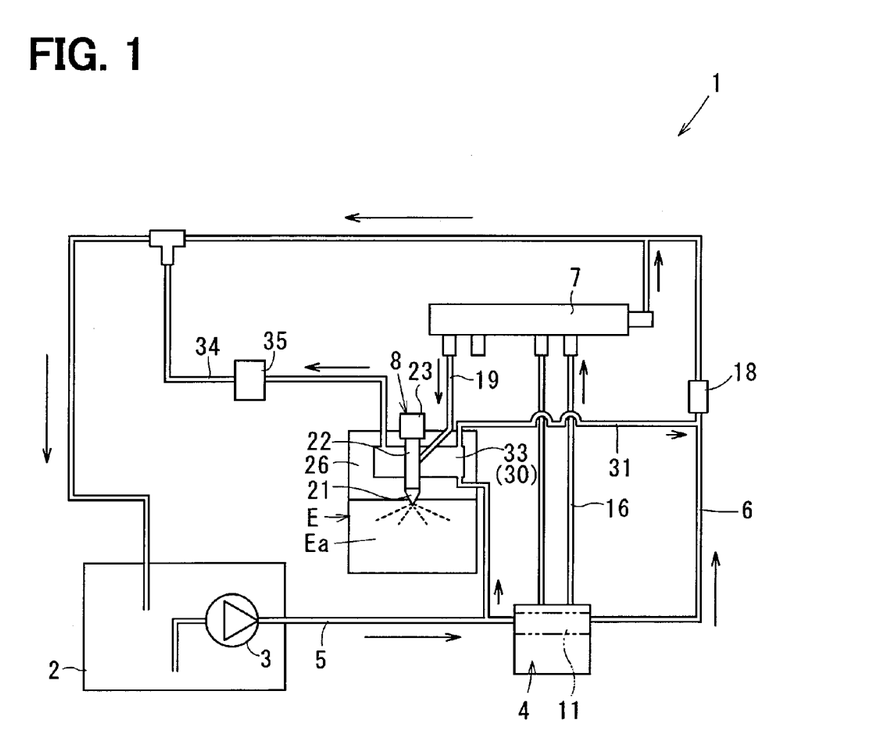
FIG. 1 is a chart showing a configuration of a fuel supply system according to a first embodiment.

The fuel supply system 1 is for supplying a fuel to combustion chamber Ea of a diesel engine (engine E). Dimethyl ether (DME) fuel is used as a fuel.

The fuel supply system 1 is provided with a fuel tank 2, a feed pump 3, a high-pressure pump 4, a feed passage 5, a return passage 6, a common-rail 7, and a fuel injector 8.

The fuel tank 2 stores fuel therein. The fuel in a fuel tank 2 is pressurized to be liquid phase state.

The feed pump 3 is arranged in the fuel tank 2. The feed pump 3 pumps up a fuel and supplies the fuel to the high-pressure pump 4 through the feed passage 5. The feed pump 3 has a feed pressure modulating device which adjusts a fuel supply pressure (feed pressure).

Figure 2:
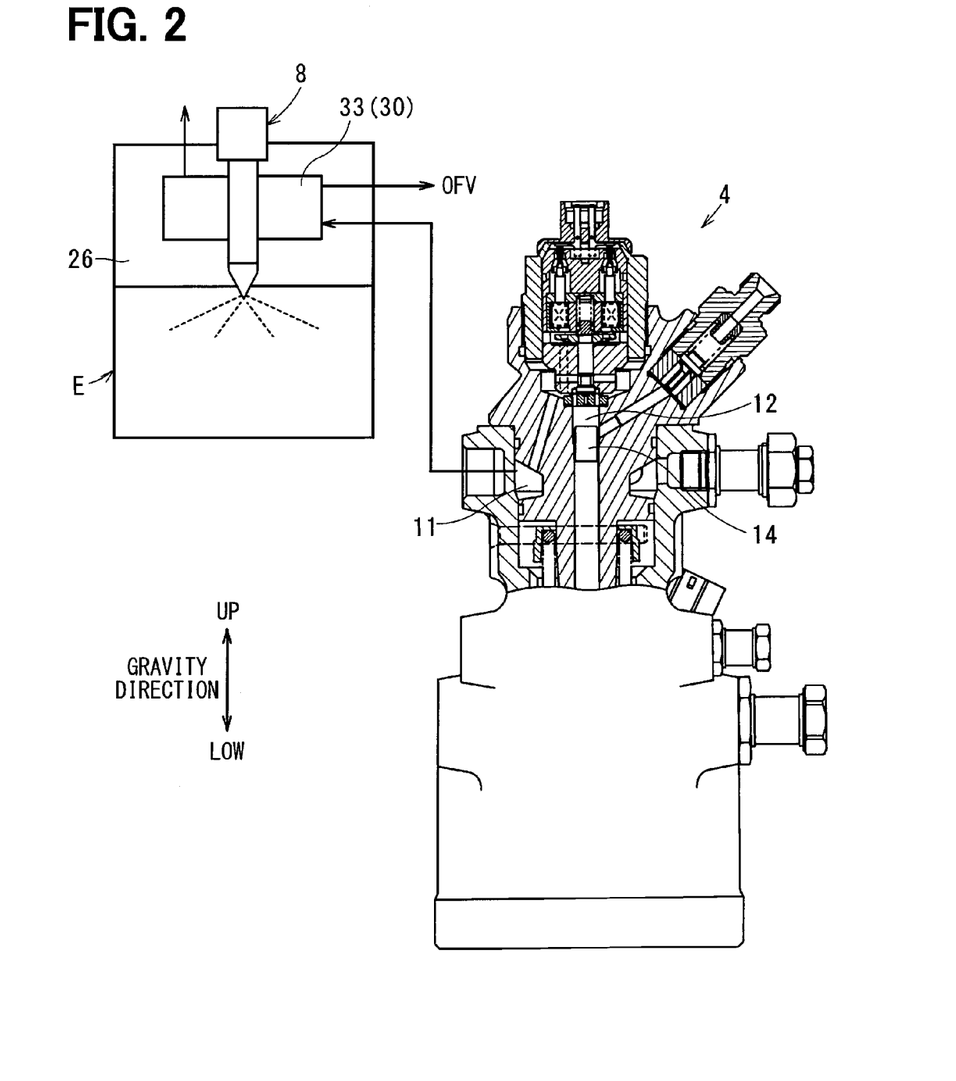
FIG. 2 is a chart for explaining an arrangement of a fuel gallery and a pressure chamber of a high-pressure pump, in a gravity direction according to the first embodiment.

The high-pressure pump 4 pressurizes and discharges the fuel so that the fuel pressure in the common-rail 7 agrees with a target pressure according to a condition of the engine E. The high-pressure pump 4 has a fuel gallery 11, a pump chamber 12 and a plunger 14 as shown in FIG. 2.

The fuel gallery 11 receives the fuel from the feed pump 3. The temperature and the pressure of the fuel in the fuel gallery 11 are adjusted so that the fuel in the fuel gallery 11 is in a liquid phase state. The pump chamber 12 receives the fuel from the fuel gallery 11. The plunger 14 reciprocates so that the fuel is suctioned from the fuel gallery 11 and is discharged from the pump chamber 12 to the common-rail 7 through a high pressure passage 16.

The feed passage 5 connects the feed pump 3 to the high-pressure pump 4. The low-pressure fuel flows through the feed passage 5. The return passage 6 connects the high-pressure pump 4 to the fuel tank 2. The returned fuel from the fuel gallery 11 flows through the return passages 6 toward the fuel tank 2.

An overflow valve (OFV) 18 is disposed in the return passages 6. The OFV 18 is opened at a specified pressure to release surplus fuel toward the fuel tank 2.

In the present embodiment, the OFV 18 is a normally-closed valve having a temperature sensing valve and a pressure operation valve. That is, the OFV 18 is a mechanical valve which opens at a specified temperature or a specified pressure.

The common-rail 7 accumulates high-pressure fuel supplied from the high-pressure pump 4 through the high pressure passage 16. The common-rail 7 is connected to the fuel injector 8 through the high pressure passage 19. That is, the common-rail 7 functions as a distribution container and a pressure accumulation container.

Figure 3:
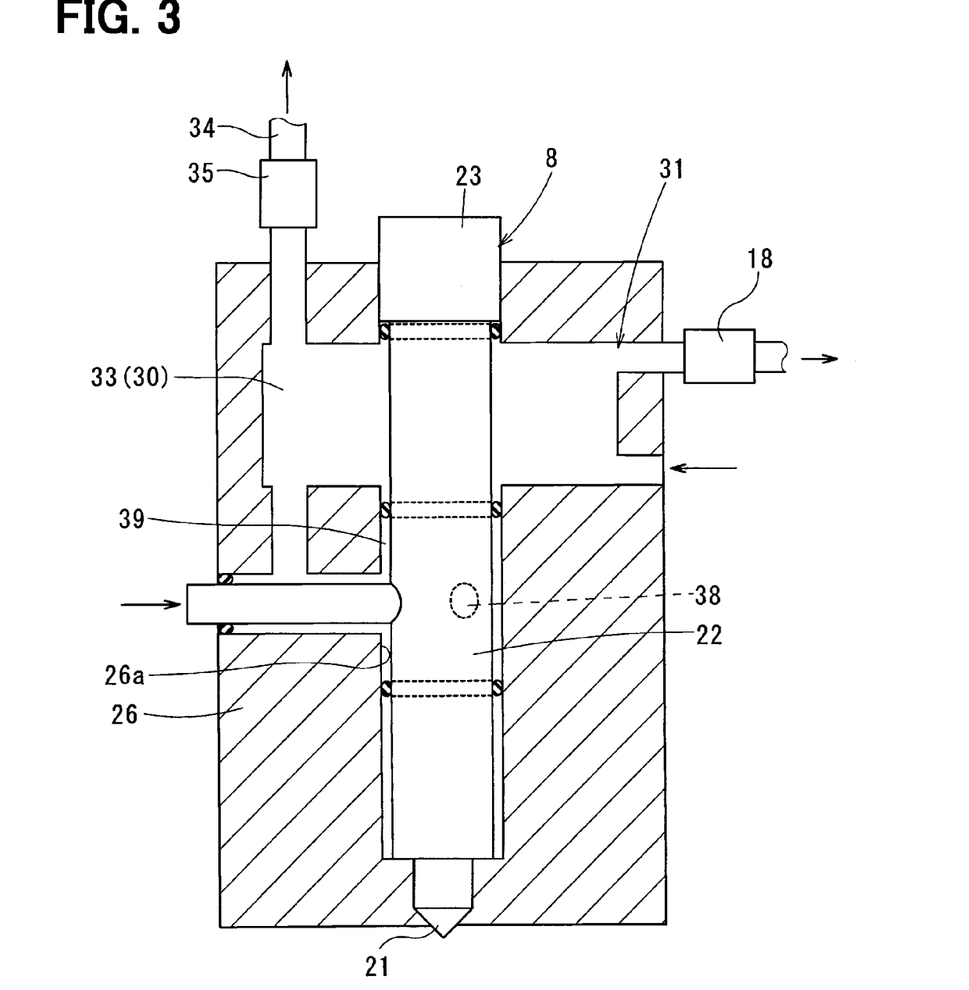
FIG. 3 is a cross sectional view showing a fuel injector and a cylinder head according to the first embodiment.

The fuel injector 8 has a fuel injection nozzle 21, a valve body 22 and an electromagnetic actuator 23. The fuel injector 8 is inserted into an insertion hole 26a formed in the cylinder head 26 of the engine E, as shown in FIG. 3. The fuel injector 8 is provided to each cylinder.

The fuel supply system 1 has a pressure chamber 30 which communicates with the fuel gallery 11. The pressure chamber 30 receives the fuel from the feed pump 3 or the returned fuel from the fuel gallery 11. The fuel in the pressure chamber 30 receives heat energy from the engine E so that the fuel is brought into gas-liquid phase.

In the present embodiment, the fuel supply system 1 is provided with a bypass passage 31 which bypasses the fuel gallery 11 so as to connect the feed passage 5 to the return passage 6. The pressure chamber 30 is defined in the bypass passage 31.

The bypass passage 31 connects the feed passage 5 to the return passages 6 at a position upstream of the OFV 18. The returned fuel from the fuel injector 8 flows into the bypass passage 31.

Specifically, a leak gallery 33 is defined in the cylinder head 26. The returned fuel from the fuel injector 8 flows into the leak gallery 33. The leak gallery 33 communicates with the bypass passage 31, so that the returned fuel from the fuel injector 8 and the feed fuel from a bypass passage 31 merge with each other. The fuel in the leak gallery 33 receives heat energy from the engine E so as to be gas phase or gas-liquid phase. The leak gallery 33 functions as the pressure chamber 30.

It should be noted that a portion where the fuel is in gas phase or in gas-liquid phase corresponds to a part of the pressure chamber 30. In the present embodiment, since it is designed that the fuel in the fuel gallery 33 is in gas phase or in gas-liquid phase, the pressure chamber 30 mainly corresponds to the leak gallery 33.

As shown in FIG. 2, the leak gallery 33 (pressure chamber 30) is positioned above the fuel gallery 11 in the gravity direction. Thus, it is prevented that the gas phase or gas-liquid phase fuel flows into the fuel gallery 11.

An injector leak passage 34 is connected to the leak gallery 33 in such a manner as to communicate with the return passages 6 at a downstream of the OFV 18. A backpressure valve 35 is provided in the injector leak passage 34. The returned fuel from the common-rail 7 flows into the return passages 6 at a downstream of the OFV 18.

The backpressure valve 35 adjusts the pressure (back pressure) of the fuel in a leak gallery 33. In the present embodiment, the backpressure valve 35 is a normally-closed valve having a temperature sensing valve and a pressure operation valve. That is, the backpressure valve 35 is a mechanical valve which opens at a specified temperature or a specified pressure.

Figure 4:
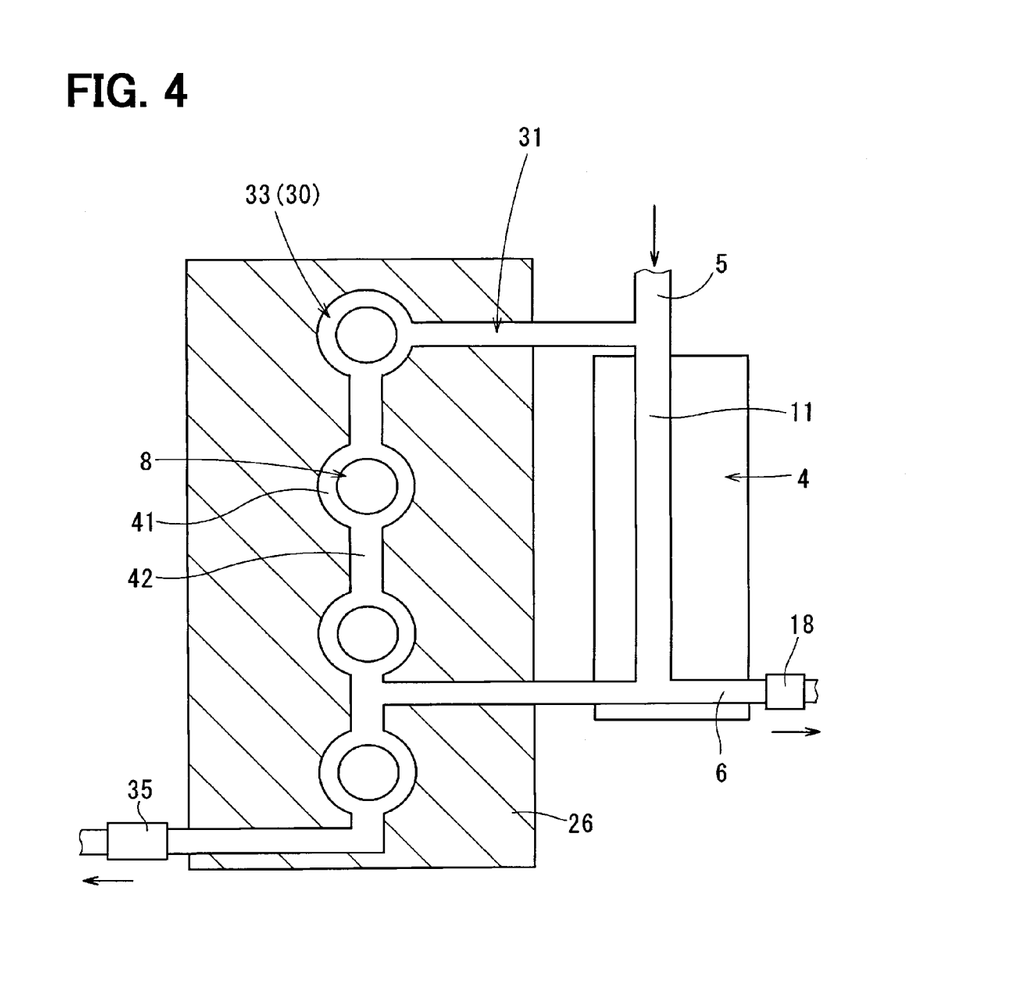
FIG. 4 is a cross sectional view showing the pressure chamber and the cylinder head according to the first embodiment.

As shown in FIG. 3 and FIG. 4, the leak gallery 33 is formed in the cylinder head 26 in such a manner as to enclose the fuel injector 8. In the insertion hole 26a of the cylinder head 26, a low-pressure portion 39 is defined. The low-pressure portion 39 has an outlet 38 through which the returned fuel flows. The leak gallery 33 communicates with the low-pressure portion 39.

As shown in FIG. 4, the leak gallery 33 consists of an annular passage 41 enclosing the fuel injector 8 and a communicating passage 42 which connects adjacent annular passages 41.

Since the leak gallery 33 (pressure chamber 30) is formed in the cylinder head 26, the heat energy is transferred from the engine E. When it is necessary to make the fuel in the pressure chamber 30 into the gas phase or the gas-liquid phase, the fuel temperature Ta in the pressure chamber 30 is made greater than or equal to the saturation temperature at which the fuel pressure Pa in the pressure chamber 30 becomes the saturated vapor pressure.

When it is necessary to make the fuel in the fuel gallery 11 into the liquid phase, the fuel temperature Tg in the fuel gallery 11 is made less than the saturation temperature at which the fuel pressure Pg in the fuel gallery 11 becomes the saturated vapor pressure.

Figure 5:
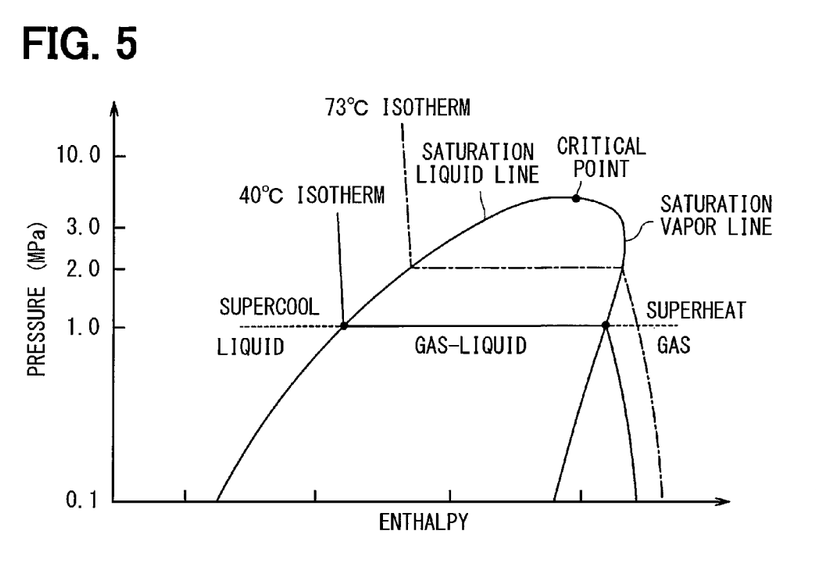
FIG. 5 is a Mollier diagram of liquefied gas fuel according to the first embodiment.

In the case of DME fuel, as shown in FIG. 5, when the saturated vapor pressure is 1 MPa, the saturation temperature is 40° C. When the saturated vapor pressure is 2 MPa, the saturation temperature is 73° C. When it is assumed that the fuel pressure Pa in the pressure chamber 30 and the fuel pressure Pg in the fuel gallery 11 are the feed pressure Pf, and when the feed pressure Pf is 2 MPa, the fuel becomes the gas phase or the gas-liquid phase at the fuel temperature Ta of 73° C. or more. When the fuel temperature Tg in the fuel gallery 11 is less than 73° C., the fuel is kept in the liquid phase.

Therefore, a heat transfer area of the pressure chamber 30 and the combustion chamber Ea, and a distance therebetween are designed so that the temperature in the pressure chamber 30 is greater than or equal to the saturation temperature at which the feed pressure Pf becomes greater than or equal to the saturated vapor pressure with the heat transferred from the engine E.

Moreover, the fuel gallery 11 is arranged apart from the engine E so that the heat energy is hardly transferred to the fuel gallery 11 from the engine E.

In a case that a gallery resisting pressure of the fuel gallery 11 is 3 MPa, the opening pressure of the backpressure valve 35 and OFV 18 is set to a specified value less than or equal to 3 MPa. The valve opening temperature of the backpressure valve 35 and the OFV 18 is set to a specified value less than or equal to 90° C. It should be noted that the saturation temperature of the DME fuel is 90° C. when the saturated vapor pressure is 3 MPa.

According to the above, the interior of the pressure chamber 30 and the fuel gallery 11 is kept at 3 MPa or less and at 90° C. or less.

Operation and Advantage of Embodiment

The fuel supply system 1 has the pressure chamber 30 which communicates with the fuel gallery 11. The pressure chamber 30 receives the fuel from the feed pump 3 or the returned fuel from the fuel gallery 11. The fuel in the pressure chamber 30 receives heat energy from the engine E so that the fuel is brought into gas-liquid phase. The fuel supply system 1 is provided with a bypass passage 31 which bypasses the fuel gallery 11 so as to connect the feed passage 5 to the return passage 6. The pressure chamber 30 is defined in the bypass passage 31.

According to the above configuration, a volume change of the fuel in liquid phase in the fuel gallery 11 can be compensated by a volume change of the fuel in gas phase or gas-liquid phase in the pressure chamber 30. Thus, the pressure pulsation in the fuel gallery 11 is absorbed in the pressure chamber 30.

The volume modulus of gas DME fuel is $1/300$-$1/400$ relative to liquid DME fuel. For this reason, the pressure change of the fuel in liquid phase in the fuel gallery 11 is easily absorbed by the volume change of the fuel in gas phase or gas-liquid phase in the pressure chamber 30. Thus, the pressure pulsation can be absorbed without using the machine element for pulsating absorption, such as a bladder type accumulator and a pulsation damper.

The returned fuel from the fuel injector 8 flows into the pressure chamber 30. Thus, the fuel temperature in the pressure chamber 30 easily rises, whereby the fuel in the pressure chamber 30 can be kept in gas phase or liquid-gas phase.

Moreover, in the present embodiment, the pressure chamber 30 is formed in the cylinder head 26 of the engine E.

According to this, the pressure chamber 30 receives the heat energy from the engine E and the fuel in the pressure chamber 30 is easily heated. That is, the fuel temperature in the pressure chamber 30 easily rise and the fuel can be kept in the gas phase or the liquid-gas phase. It should be noted that the pressure chamber 30 can be formed in a cylinder block of the engine E.

Moreover, since the pressure chamber 30 is arranged above the fuel gallery 11 in the gravity direction, it is prevented that the gas phase or gas-liquid phase fuel in the pressure chamber 30 flows into the fuel gallery 11.

Second Embodiment

Figure 6:
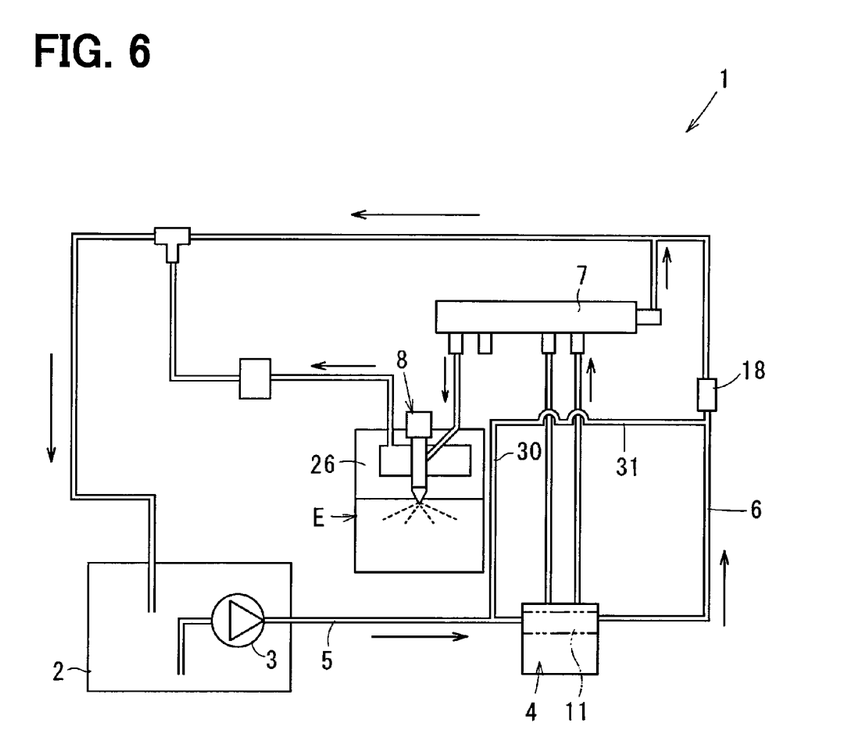
FIG. 6 is a chart showing a configuration of a fuel supply system according to a second embodiment.

Referring to FIG. 6, a second embodiment will be described.

In the second and the successive embodiments, the same parts and components as those in the first and the second embodiments are indicated with the same reference numerals and the same descriptions will not be reiterated.

The bypass passage 31 is an independent passage into which no returned fuel from the fuel injector 8 flows. A part of the bypass passage 31 is arranged close to the cylinder head 26 to receive the heat energy from the engine E. The fuel in the bypass passage 31 becomes the gas phase fuel or the gas-liquid phase fuel. A portion of the bypass passage 31 receiving the heat energy functions as the pressure chamber 30.

Thus, the pressure pulsation can be absorbed without using the machine element for pulsating absorption, such as a bladder type accumulator and a pulsation damper.

Third Embodiment

Figure 7:
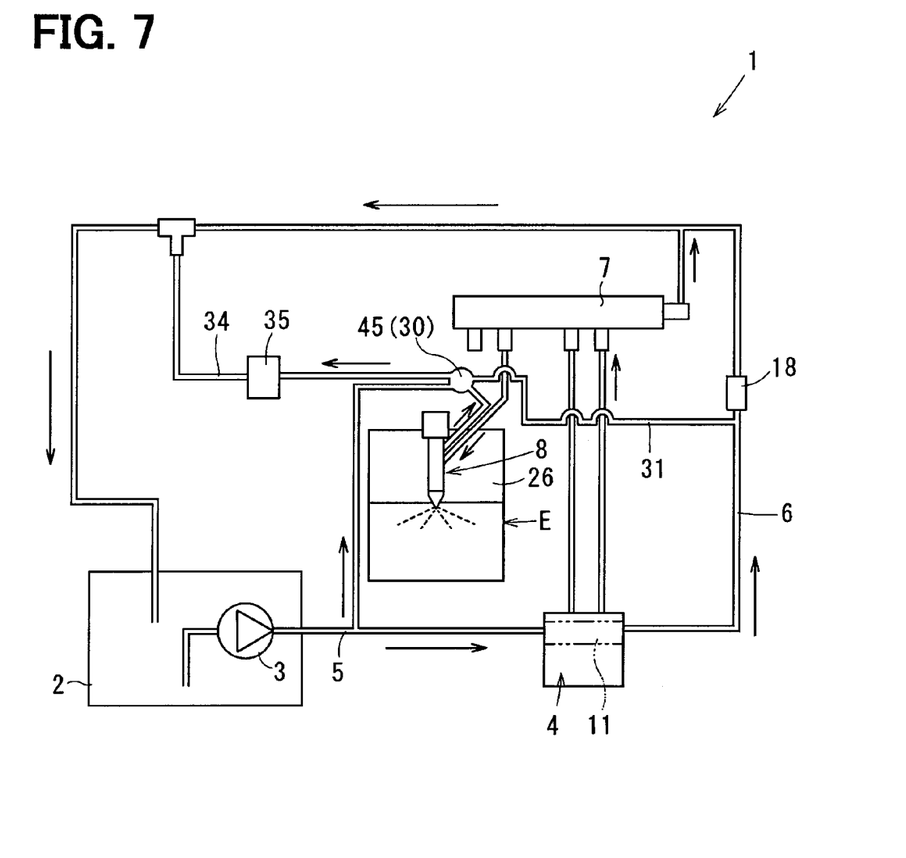
FIG. 7 is a chart showing a configuration of a fuel supply system according to a third embodiment.

Referring to FIG. 7, a third embodiment will be described.

In the present embodiment, the pressure chamber 30 is formed outside of a housing of the engine E. That is, a chamber 45 is defined in the bypass passage 31 into which the returned fuel from the fuel injector 8 flows. The chamber 45 is arranged close to the cylinder head 26 of the engine E. The fuel in the chamber 45 is heated by the engine E or the returned fuel from the fuel injector 8, whereby the fuel becomes the gas phase or the gas-liquid phase. That is, the chamber 45 corresponds to the pressure chamber 30.

Thus, the pressure pulsation can be absorbed without using the machine element for pulsating absorption, such as a bladder type accumulator and a pulsation damper.

Fourth Embodiment

Figure 8:
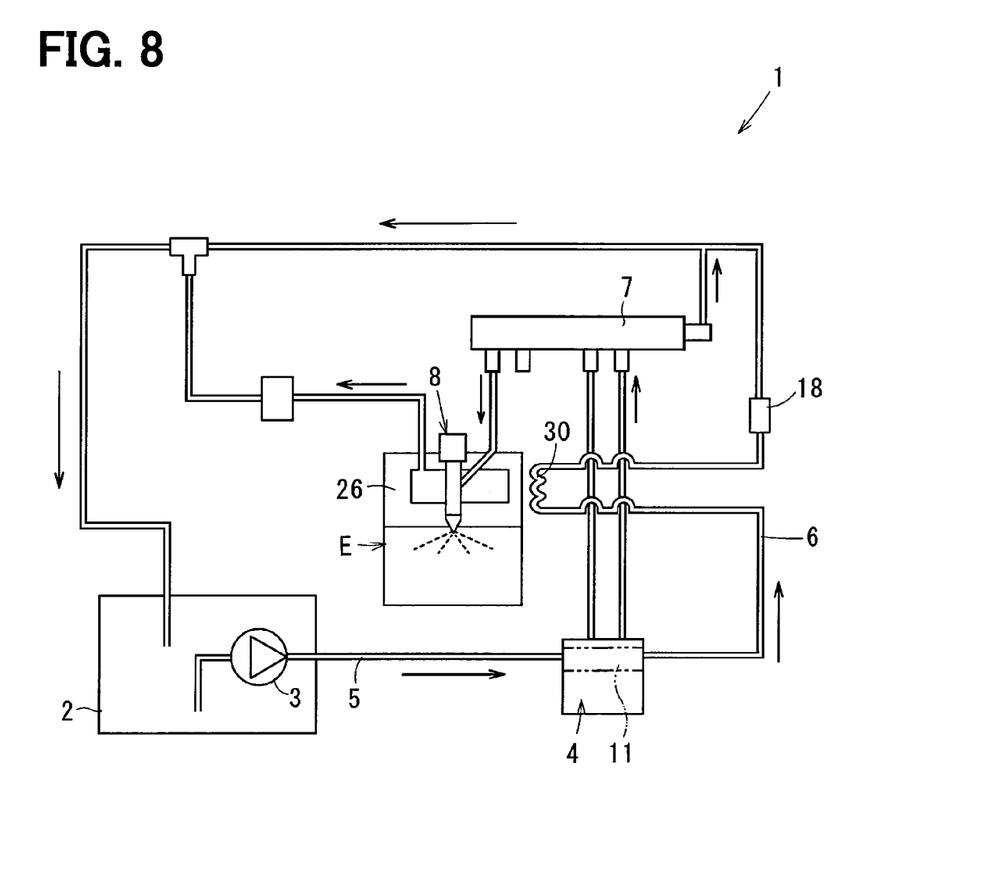
FIG. 8 is a chart showing a configuration of a fuel supply system according to a fourth embodiment.

Referring to FIG. 8, a fourth embodiment will be described.

In the fourth embodiment, the system 1 is provided with no bypass passage. The pressure chamber 30 is formed in the return passage 6.

A part of the return passage 6 is arranged close to the cylinder head 26 to receive the heat energy from the engine E. The fuel in the return passage 6 becomes the gas phase fuel or the gas-liquid phase fuel. That is, a portion of the return passage 6 receiving the heat energy functions as the pressure chamber 30.

Thus, the pressure pulsation can be absorbed without using the machine element for pulsating absorption, such as a bladder type accumulator and a pulsation damper.

Fifth Embodiment

Figure 9:
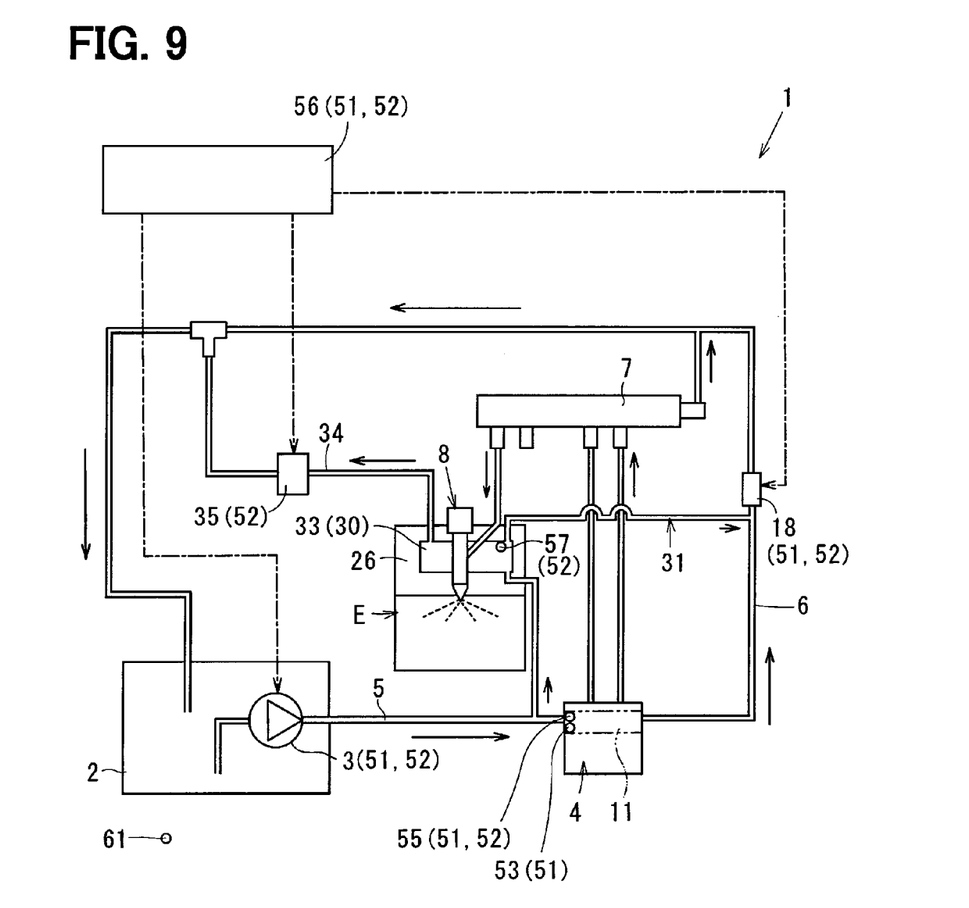
FIG. 9 is a chart showing a configuration of a fuel supply system according to a fifth embodiment.
Figure 10:
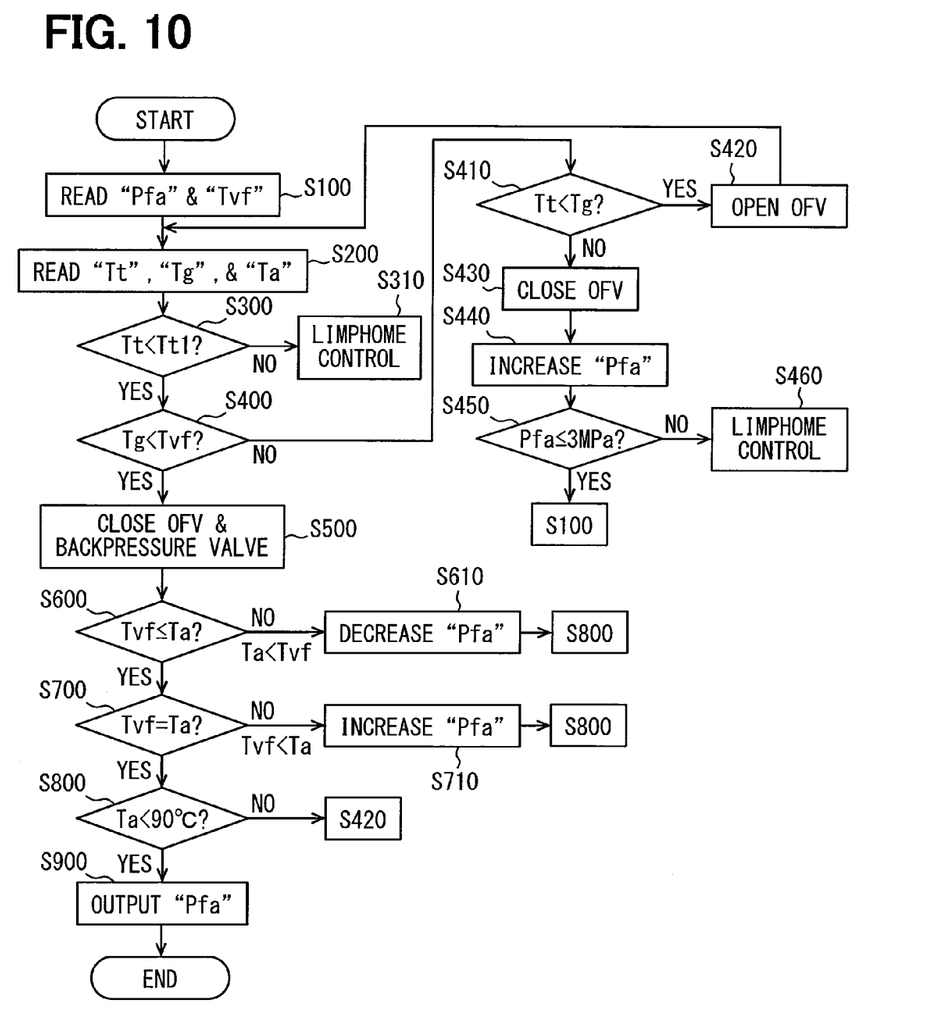
FIG. 10 is a flow chart of phase control of a fuel according to the fifth embodiment.

Referring to FIGS. 9 and 10, a fifth embodiment will be described.

In the above first embodiment, the temperature gradient of the fuel between the fuel gallery 11 and the pressure chamber 30 is generated, so that the fuel in the fuel gallery 11 becomes the liquid phase and the fuel in the pressure chamber becomes the gas phase or the liquid-gas phase. However, due to ambient temperature, the fuel temperature in the fuel gallery 11 and the pressure chamber 30 may fluctuate. So, according to the present embodiment, the fuel phase in the fuel gallery 11 and the pressure chamber 30 can be controlled more accurately.

In the present embodiment, the system 1 provided with a first phase-control portion 51 which controls at least one of the fuel temperature and the fuel pressure in the fuel gallery in such a manner that the fuel in the fuel gallery 11 is kept in liquid phase. Further, the system 1 provided with a second phase-control portion 52 which controls at least one of the fuel temperature and the fuel pressure in the pressure chamber 30 in such a manner that the fuel in the pressure chamber 30 is kept in gas phase or gas-liquid phase.

Since the fuel phase depends on the relationship between fuel pressure and fuel temperature, both of the fuel pressure and the fuel temperature are controlled. In a case that the fuel pressure is constant, the fuel temperature is controlled. In a case that the fuel temperature is constant, the fuel pressure is controlled.

The OFV 18 and the backpressure valve 35 are normally-closed electromagnetic valves.

The first phase-control portion 51 includes a Tg-sensor 53 detecting the fuel temperature Tg in the fuel gallery 11, and a Pg-sensor detecting the fuel pressures Pg in the fuel gallery 11, a feed-pressure sensor 55 detecting the feed pressure Pf, the feed pump 3, the OFV 18, and the ECU 56 controlling the feed pump 3 and the OFV 18. In the present embodiment, since the fuel pressure Pg in the fuel gallery 11 is equal to the feed pressure Pf, the feed-pressure sensor 55 functions as the Pg-sensor.

The ECU 56 controls the feed pump 3 and the OFV 18 based on the fuel temperature Tg and the fuel pressures Pg. That is, according to target values of the fuel pressures Pg and the fuel temperature Tg, the ECU 56 outputs command signals to the OFV 18 and the backpressure valve 35, and a command feed pressure Pfa of the feed pump 3.

When it is necessary to increase the fuel pressure Pg, the OFV 18 is opened and the command feed pressure Pfa is increased. When it is necessary to decrease the fuel temperature Tg, the OFV 18 is opened to replace the fuel in the fuel gallery 11. That is, a high-temperature fuel is discharged from the fuel gallery 11 and low-temperature is introduced into the fuel gallery 11 from the fuel tank 2.

The second phase-control portion 52 includes a Ta-sensor 57 detecting the fuel temperature Ta in the pressure chamber 30, a Pa-sensor detecting the fuel pressure Pa in the compression chamber 30, a feed-pressure sensor 55 detecting the feed pressure Pf, the feed pump 3, the OFV 18, the backpressure valve 35 and the ECU 56 controlling the feed pump 3, the OFV 18 and the backpressure valve 35.

In the present embodiment, since the fuel pressure Pa in the pressure chamber 30 is equal to the feed pressure Pf, the feed-pressure sensor 55 functions as the Pa-sensor.

The ECU 56 controls the feed pump 3, the OFV 18 and the backpressure valve 35 based on the fuel temperature Ta and the fuel pressures Pa. That is, according to target values of the fuel pressures Pa and the fuel temperature Ta, the ECU 56 outputs command signals to the OFV 18 and the backpressure valve 35, and a command feed pressure Pfa of the feed pump 3.

Moreover, the fuel supply system 1 is a Tt-sensor 61 which detects the fuel temperature in the fuel tank.

Hereinafter, referring to FIG. 10, a control flow for controlling the fuel phase will be described. FIG. 10 shows a control in which the fuel in the fuel gallery 11 is brought into the liquid phase and the fuel in the pressure chamber 30 is brought into the gas-liquid phase.

In S100, the ECU 56 reads the command feed pressure Pfa and the saturation temperature Tvf at which the command feed pressure Pfa becomes the saturated vapor pressure.

In S200, the ECU 56 reads the outputs from the Tt-sensor 61, the Tg-sensor 53, and the Ta-sensor 57.

In S300, the ECU 56 determines whether the fuel temperature Tt in the fuel tank 2 is less than a specified value Tt1. The specified value Tt1 corresponds to a tank limiting temperature at which the limphome control should be conducted. Therefore, when the answer is NO in S300, the ECU 56 outputs an limphome control command in S310.

It should be noted that the fuel pressure in the fuel tank 2 may be compared with a limit pressure of the fuel tank 2 in S300.

When the answer is YES in S300, the procedure proceeds to S400.

In S400, the ECU 56 determines whether the fuel temperature Tg in the fuel gallery 11 is less than the saturation temperature Tvf.

When the answer is NO in S400, the fuel in the fuel gallery 11 is not in liquid phase. The procedure proceeds to S410 in order to bring the fuel into the liquid phase.

In S410, the ECU 56 determines whether the fuel temperature Tt in the fuel tank 2 is lower than the fuel temperature Tg in the fuel gallery 11.

When the answer is YES in S410, the procedure proceeds to S420 in which the OFV 18 is opened so that the high-temperature in the fuel gallery 11 is discharged and the low-temperature fuel is introduced into the fuel gallery 11 from the fuel tank 2. Then, the procedure goes back to S200.

When the answer is NO in S410, the fuel temperature in the fuel tank 2 is high. Even if the OFV 18 is opened, the fuel temperature in the fuel gallery 11 is hardly decreased.

The procedure proceeds to S430 in which the OFV 18 is closed to increase the feed pressure. The procedure proceeds to S440 in which the command feed pressure Pfa is updated so that the fuel can be kept in the liquid phase at the fuel temperature Tg in the fuel gallery 11.

It should be noted that the command feed pressure Pfa may be updated to the vapor pressure at the fuel temperature Tt in the fuel tank.

Then, the procedure proceeds to S450 in which the ECU 56 determines whether the updated command feed pressure Pfa is less than or equal to a resisting pressure of the fuel gallery 11. In the present embodiment, the resisting pressure of the fuel gallery 11 is 3 MPa.

When the answer is NO in S450, the procedure proceeds to S460 in which a limphome control command is outputted.

When the answer is YES in S450, the procedure goes back to S100.

When the answer is YES in S400, the fuel in the fuel gallery 11 is in liquid phase. The procedure proceeds to S500 in order to keep the fuel in the gas-liquid phase in the pressure chamber 30.

In S500, the OFV 18 and the backpressure valve 35 are closed in order to control the pressure in the pressure chamber 30. Besides, the OFV 18 and the backpressure valve 35 are normally-closed valves.

Then, the procedure proceeds to S600 in which the ECU 56 determines whether the fuel temperature Ta in the pressure chamber 30 is higher than or equal to a saturation temperature Tvf. When the answer is NO in S600, the fuel is in the liquid phase.

It is difficult to control the fuel temperature in the pressure chamber 30 by transferring the heat energy from the engine E. The procedure proceeds to S610 in which the command feed pressure Pfa is updated so that the fuel can be kept in the gas-liquid phase at the fuel temperature Ta. That is, the command feed pressure Pfa is decreased, so that the fuel in the pressure chamber 30 is brought into the gas-fuel phase.

When the answer is YES in S600, the fuel in the pressure chamber 30 is in the gas phase or the gas-liquid phase.

Then the procedure proceeds to S700 in which the ECU 56 determines whether the fuel temperature Ta in the pressure chamber 30 is equal to the saturation temperature Tvf. When the answer is NO in S700, the fuel temperature Ta in the pressure chamber 30 is higher than the saturation temperature Tvf and the fuel in the pressure chamber 30 is in the gas phase.

Even if the fuel in the pressure chamber 30 is in the gas phase, the pressure pulsation in the fuel gallery 11 can absorbed. However, a degree of superheat (refer to FIG. 5) is increased, the volume of the gas fuel may be excessively increased. In the present embodiment, the pressure pulsation is absorbed when the fuel is in the gas-fuel phase. The procedure proceeds to S710 in which the command feed pressure Pfa is increased. That is, the command feed pressure Pfa is updated so that the fuel can be kept in the gas-liquid phase at the fuel temperature Ta in the pressure chamber 30.

When the answer is YES in S700, the fuel temperature Ta in the pressure chamber 30 is equal to the saturation temperature Tvf, and the fuel in the pressure chamber 30 is in gas-liquid phase.

In S800, the ECU 56 determines whether the fuel temperature Ta in the pressure chamber 30 is lower than a limiting temperature of 90° C. When the answer is NO in S800, the procedure proceeds to S420 in which the OFV 18 is opened. That is, a high-temperature fuel is discharged from the fuel gallery 11 and low-temperature is introduced into the fuel gallery 11 from the fuel tank 2.

It should be noted that the limiting temperature in the pressure chamber 30 is a maximum saturation temperature at the fuel pressure Pa in the pressure chamber 30. In the present embodiment, the maximum value of the feed pressure is set to 3 MPa, and the maximum value of the fuel pressure Pa is also 3 MPa. The limiting temperature in the pressure chamber 30 is 90° C., which corresponds to the saturation temperature at 3 MPa.

When the answer is YES in S800, the command feed pressure Pfa is transmitted to the feed pump 3.

According to the present embodiment, the fuel in the pressure chamber 30 can be certainly brought into the gas-liquid phase and the fuel in the fuel gallery 11 can be certainly brought into the liquid phase. Therefore, a pressure pulsation in the fuel gallery 11 can be certainly absorbed in the pressure chamber 30.

Modification

Figure 11:
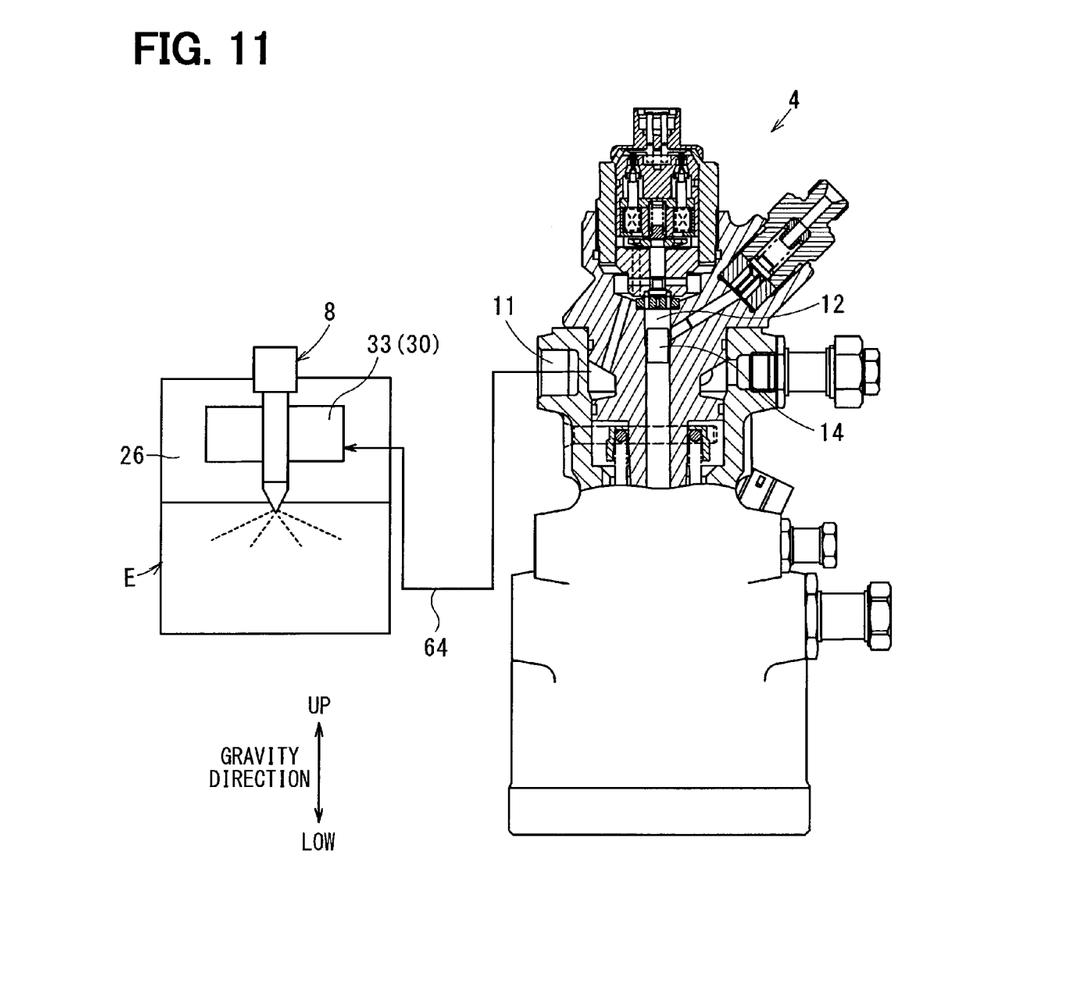
FIG. 11 is a chart for explaining an arrangement of a fuel gallery and a pressure chamber of a high-pressure pump, in a gravity direction according to a first modification.

In the above first embodiment, the pressure chamber 30 is arranged above the fuel gallery 11 in the gravity direction, whereby it is prevented that the gas phase or gas-liquid phase fuel in the pressure chamber 30 flows into the fuel gallery 11. However, as shown in FIG. 11, the pressure chamber 30 and the fuel gallery 11 may be connected with each other through a siphon pipe 64 in order that it is prevented that the gas phase or gas-liquid phase fuel in the pressure chamber 30 flows into the fuel gallery 11.

That is, even when the pressure chamber 30 is arranged below the fuel gallery 11, as long as the siphon pipe 64 extends below the pressure chamber 30, the gas phase fuel or gas-liquid phase fuel in the pressure chamber 30 does not flow into the fuel gallery 11.

Figure 12:
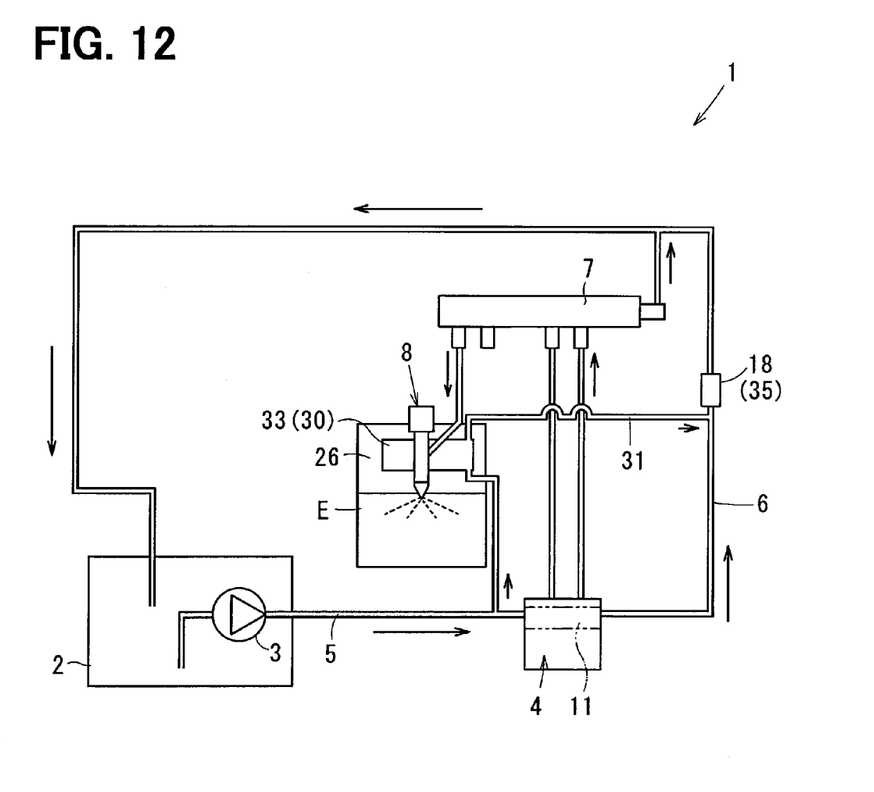
FIG. 12 is a chart showing a configuration of a fuel supply system according to a second modification.

Moreover, in the above first embodiment, the returned fuel from the fuel injector 8 is returned to the fuel tank 2 through a passage defined by the leak gallery 33 and the bypass passage 31, and a passage defined by the injector leak passage 34. However, as shown in FIG. 12, it is not necessary to provide the injector leak passage 34. In this case, the bypass passage 31 functions as a leak passage through which the returned fuel flows. Further, as shown in FIG. 12, the OFV 18 functions also as the backpressure valve 35.

Figure 13:
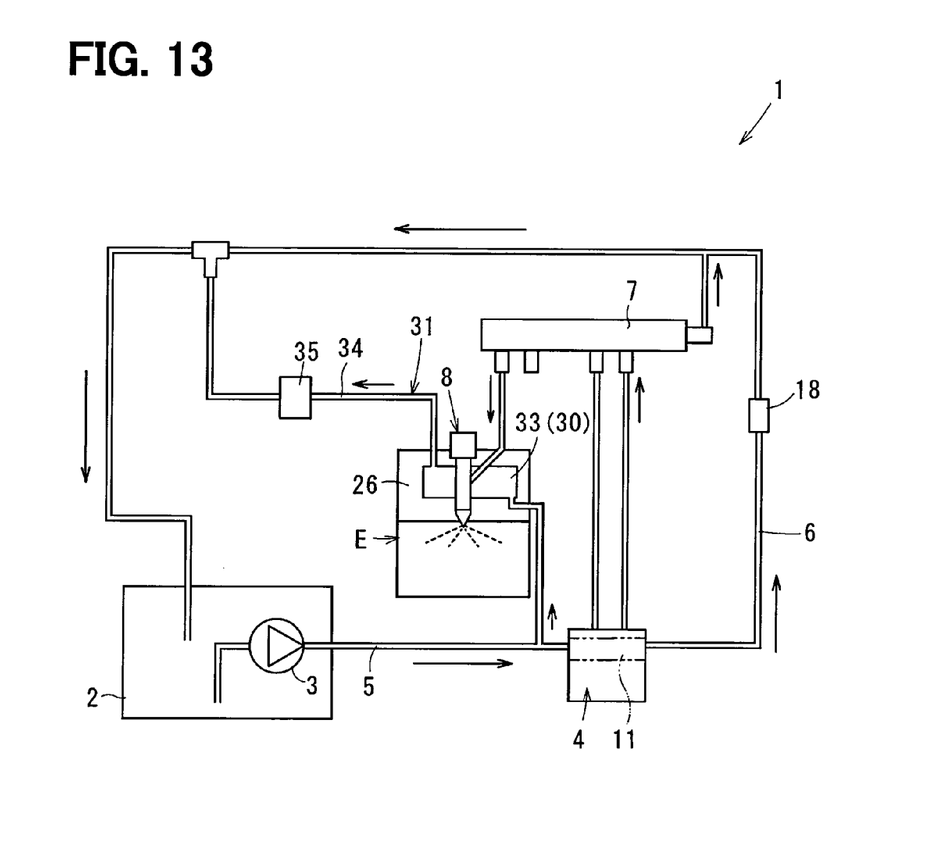
FIG. 13 is a chart showing a configuration of a fuel supply system according to a third modification.

Moreover, as shown in FIG. 13, in the first embodiment, it is unnecessary to provide a passage connecting the leak gallery 33 and the return passage 6. That is, the bypass passage 31 is defined by a passage connecting the feed passage 5 and the leak gallery 33, the leak gallery 33 and the injector gallery 33. The leak gallery 33 functions as the pressure chamber 30.

Moreover, the fuel is not limited to the DME fuel. Other kind of liquefied gas fuel can be used.

What is claimed is:

1. A fuel supply system comprising:
   a fuel tank containing a liquefied gas fuel;
   a feed pump feeding the liquefied gas fuel from the fuel tank;
   a high-pressure pump having a fuel gallery into which the fuel in liquid phase is introduced from the feed pump;
   a pump chamber into which the fuel is introduced from the fuel gallery and a plunger which pressurizes the fuel in the pump chamber; and
   a pressure chamber which communicates with the fuel gallery and receives the fuel from the feed pump or a returned fuel from the fuel gallery, wherein
   the fuel in the pressure chamber receives heat energy from a specified heat source so that the fuel is brought into gas phase or gas-liquid phase.

2. A fuel supply system according to claim 1, further comprising:
   a feed passage for introducing the fuel into the fuel gallery from the feed pump;
   a return passage for returning the fuel returned from the fuel gallery into the fuel tank; and
   a bypass passage which bypasses the fuel gallery and connects the feed passage and the return passages, wherein
   the pressure chamber is defined in the bypass passage.

3. A fuel supply system according to claim 1, further comprising:
   a return passage for returning the fuel returned from the fuel gallery into the fuel tank, wherein
   the pressure chamber is defined in the return passage.

4. A fuel supply system according to claim 1, further comprising:
   a fuel injector which injects the fuel pressurized in the pump chamber into a combustion chamber of an engine; wherein:
   the fuel returned from the fuel injector flows into the pressure chamber.

5. A fuel supply system according to claim 1, wherein:
   the pressure chamber is defined in a housing of the engine.

6. A fuel supply system according to claim 1, wherein:
   the specified heat source is an engine.

7. A fuel supply system according to claim 1, wherein:
   the pressure chamber is arranged above the fuel gallery in a gravity direction or the pressure chamber is connected to the fuel gallery through a siphon pipe, so that the fuel in the gas phase or the gas-liquid phase in the pressure chamber is prevented from flowing into the fuel gallery.

8. A fuel supply system according to claim 1, further comprising:
   a first phase-control portion which controls at least one of a fuel temperature and a fuel pressure in the fuel gallery in such a manner that the fuel in the fuel gallery is kept in the liquid phase; and
   a second phase-control portion which controls at least one of the fuel temperature and the fuel pressure in the pressure chamber in such a manner that the fuel in the pressure chamber is kept in the gas phase or the gas-liquid phase.

* * * * *